(12) United States Patent
Beauregard

(10) Patent No.: US 9,301,096 B2
(45) Date of Patent: Mar. 29, 2016

(54) RANGE RATE BASED STOPPED DETECTION

(71) Applicant: QUALCOMM Incorporated, San Diego, CA (US)

(72) Inventor: Stephen Joseph Beauregard, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 14/273,392

(22) Filed: May 8, 2014

(65) Prior Publication Data

US 2015/0327017 A1  Nov. 12, 2015

(51) Int. Cl.
| | | |
|---|---|---|
| *H04W 24/00* | (2009.01) | |
| *H04W 4/02* | (2009.01) | |
| *G01S 19/24* | (2010.01) | |
| *G01S 5/14* | (2006.01) | |
| *G01S 5/02* | (2010.01) | |
| *G01S 13/76* | (2006.01) | |
| *H04W 88/02* | (2009.01) | |

(52) U.S. Cl.
CPC ............... *H04W 4/023* (2013.01); *G01S 5/02* (2013.01); *G01S 5/145* (2013.01); *G01S 13/765* (2013.01); *G01S 19/24* (2013.01); *H04W 88/02* (2013.01)

(58) Field of Classification Search
CPC .............................. H04W 4/023; H04W 88/02
USPC ..................................................... 455/456.6
See application file for complete search history.

(56) References Cited

U.S. PATENT DOCUMENTS

| | | | |
|---|---|---|---|
| 5,959,568 A | 9/1999 | Woolley | |
| 8,521,184 B2 | 8/2013 | Shen | |
| 8,666,434 B1* | 3/2014 | Taylor | G01S 19/39 455/404.2 |
| 8,818,396 B2* | 8/2014 | Fok | H04W 64/00 340/539.13 |
| 2007/0279237 A1* | 12/2007 | Julian | G01S 5/0284 340/686.1 |
| 2008/0318596 A1 | 12/2008 | Tenny | |
| 2010/0178940 A1 | 7/2010 | McAleenan et al. | |
| 2012/0079018 A1* | 3/2012 | Rottler | H04W 4/023 709/204 |
| 2012/0129461 A1* | 5/2012 | Venkatraman | G01S 5/0236 455/67.11 |

(Continued)

FOREIGN PATENT DOCUMENTS

| | | |
|---|---|---|
| EP | 1862811 A2 | 12/2007 |
| EP | 2275830 A1 | 1/2011 |

(Continued)

OTHER PUBLICATIONS

Deblauwe, N., et al., "Hybrid GPS and GSM Localization—Energy-efficient Detection of Spatial Triggers", Proceeding of the 5th Workshop on Positioning, Navigation and Communication 2008 (WPNC'08), pp. 181-189.

(Continued)

*Primary Examiner* — Charles Shedrick
(74) *Attorney, Agent, or Firm* — Kilpatrick Townsend & Stockton LLP

(57) ABSTRACT

Methods, devices, and systems are described for determining whether a mobile device is in a stopped state based at least in part on round trip time (RTT) measurements between the device and at least one access point. The stopped state determination may be based on RTT measurements alone, or on RTT measurements in combination with other positioning and movement measurements. Further, filtering such as particle and Kalman filtering may be used to improve determination of whether the device is in a stopped state.

29 Claims, 9 Drawing Sheets

(56) References Cited

U.S. PATENT DOCUMENTS

| | | | |
|---|---|---|---|
| 2013/0016012 A1* | 1/2013 | Beauregard | H04W 4/043 342/450 |
| 2013/0122929 A1* | 5/2013 | Al-Mufti | H04W 24/00 455/456.1 |
| 2013/0122935 A1* | 5/2013 | Das | H04W 4/028 455/456.3 |
| 2013/0176869 A1 | 7/2013 | Finlow-Bates et al. | |
| 2013/0267251 A1* | 10/2013 | Khorashadi | H04W 4/023 455/456.3 |

FOREIGN PATENT DOCUMENTS

| | | |
|---|---|---|
| WO | WO-2010051413 A1 | 5/2010 |
| WO | WO-2010059934 A2 | 5/2010 |

OTHER PUBLICATIONS

International Search Report and Written Opinion—PCT/US2015/025372—ISA/EPO—Jul. 20, 2015.

* cited by examiner

202 | Collecting a plurality of round trip time (RTT) measurements between a mobile device and at least one access point (AP).

204 | Analyzing the plurality of RTT measurements

206 | Determining that the mobile device is in a stopped state based, at least in part, on the analyzing of the plurality of RTT measurements between the mobile device and the at least one AP.

FIG. 2A

| 202 | Collecting a plurality of round trip time (RTT) measurements between a mobile device and at least one access point (AP). |

| 224 | Analyzing the plurality of RTT measurements and determining that the mobile device is in a stopped state based, at least in part, on the analyzing of the plurality of RTT measurements between the mobile device and the at least one AP. |

| 224a | Determining that a position of the mobile device remains within a threshold area during a first period of time |

| 224b | Combining RTT data with other movement data such as GNSS positioning, RSSI, barometer, accelerometer, or other data to improve motion determination. |

| 224c | Filtering data to improve motion determination (e.g. with particle filters, Kalman filters, or motion models.) |

RANGE RATE BASED STOPPED DETECTION

FIELD

Aspects of the disclosure relate to determining whether a device is in a stopped state, and in particular, to using round trip time (RTT) measurements for at least a portion of a determination as to whether a mobile device is in a stopped state.

BACKGROUND

Mobile devices such as smart phones, tablets, laptop computers, and other such electronic devices have developed to include additional functionality for determining the location of the device. While such location functionality may serve for providing location services and direction services, additional functionality may be derived from the elements used to implement location services. One potential piece of information that may be derived from location functionality is whether a device is in a stopped state where a user is not moving, or is moving only a small amount. This information may be used in a variety of ways by the device.

A known method of stopped detection is the use of an accelerometer to measure device movement, with a stopped state based on the measurement of the accelerometer. Such measurements, however, are vulnerable to sudden movements and device shaking. There is therefore a need for improved systems and methods for determining a device stopped state.

BRIEF SUMMARY

Embodiments described herein include systems, methods, devices, and computer-readable media for determining whether a device is in a stopped state using RTT measurements.

One embodiment may be a method comprising: collecting a plurality of round trip time (RTT) measurements between a mobile device and at least one access point (AP); analyzing the plurality of RTT measurements; and determining that the mobile device is in a stopped state based, at least in part, on the analyzing of the plurality of RTT measurements between the mobile device and the at least one AP.

Additional embodiments of such a method may function where the plurality of RTT measurements comprise a first plurality of RTT measurements between the mobile device and a first AP and a second plurality of RTT measurements between the mobile device and a second AP.

Additional embodiments of such a method may function where determining that the mobile device is in the stopped state comprises independently analyzing the first plurality of RTT measurements and the second plurality of RTT measurements, and determining that the mobile device is in the stopped state if both the first plurality of RTT measurements and the second plurality of RTT measurements independently identify that the mobile device is in the stopped state.

Additional embodiments of such a method may further comprise collecting movement data from a plurality of data sources; where determining that the mobile device is in the stopped state comprises determining that a user identified threshold number of the plurality of data sources and the RTT measurements identify the mobile device as in the stopped state.

Additional embodiments of such a method may function where determining that the mobile device is in the stopped state comprises determining that a change in RTT measurement is below a predetermined threshold for a first period of time or where determining that the mobile device is in the stopped state further comprises filtering the plurality of RTT measurements between the mobile device and the at least one AP.

Additional embodiments of such a method may function where the RTT measurements are filtered using a free particle filter or where determining whether the mobile device is in the stopped state is further based at least in part on at least one global navigation satellite service (GNSS) measurement.

Additional embodiments of such a method may function where the determining whether the mobile device is in the stopped state is further based at least in part on received signal strength indication (RSSI) measurements between the mobile device and the at least one AP or where the determining whether the mobile device is in the stopped state is further based on an analysis of a correlation between the RSSI measurements and the RTT measurements.

Additional embodiments of such a method may function where the determining whether the mobile device is in the stopped state is further based at least in part on sensor data from an accelerometer of the mobile device during a first time period or where the determining whether the mobile device is in the stopped state is further based on an output of a Kalman filter using the sensor data, the RSSI measurements, and the RTT measurements.

Additional embodiments of such a method may function where determining that the mobile device is in the stopped state comprises determining, based at least in part on the plurality of RTT measurements, that a position of the mobile device remains within a threshold area during a first period of time. Still further embodiments of this embodiment may function where threshold area is based at least in part on a known noise value associated with RTT measurements involving the at least one AP; where the threshold area is associated with a user selected or otherwise predetermined displacement value; where the user selected or predetermined displacement value is 5 cm or where the user selected displacement value is 5 m. In certain embodiments, the predetermined displacement value is received as a user input at the mobile device.

Additional embodiments of such a method may function where initiating collection of the plurality of RTT measurements in response to a signal from a tracking device that is separate from the mobile device. Additional embodiments may further involve receiving, at the tracking device, a request for the stopped state from a position tracking management entity; and communicating the signal from the tracking device to the mobile device in response to receiving the Another alternative embodiment may be a mobile device comprising: means for collecting a plurality of round trip time (RTT) measurements between the mobile device and at least one access point (AP); means for analyzing the plurality of RTT measurements; and means for determining that the mobile device is in a stopped state based, at least in part, on the analyzing of the plurality of RTT measurements between the mobile device and the at least one AP.

Additional embodiments of such a mobile device may further include means for collecting a plurality of movement measurements in addition to the RTT measurements; and means for filtering the plurality of RTT measurements and the plurality of movement measurements. Additional embodiments of such a mobile device may further include means for communicating results of the determining that the mobile device is in the stopped state to a user.

Another alternative embodiment may be mobile device comprising: a processor; a wireless transceiver coupled to the processor; and a memory coupled to the processor and comprising a round trip time (RTT) positioning module which causes the processor to: collect a plurality of round trip time (RTT) measurements between the mobile device and at least one access point (AP); and determine that the mobile device is in a stopped state by analyzing the plurality of RTT measurements between the wireless transceiver and the at least one AP.

Additional embodiments of such a mobile device may further include a user input module connected to the processor, wherein the RTT positioning module further causes the processor to: display a user interface on the mobile device; and accept a predetermined threshold as a user selected threshold via the user interface.

Additional embodiments of such a mobile device may further function where the RTT positioning module further causes the processor to: initiate collection of the plurality of RTT measurements in response to a request from an application module for the stopped state.

Another embodiment may be a non-transitory computer-readable instruction medium comprising instructions that, when executed by a processor coupled to the non-transitory computer-readable instruction medium, cause a mobile device comprising the processor to: collect a plurality of round trip time (RTT) measurements between the mobile device and at least one access point (AP); and determine that the mobile device is in a stopped state by analyzing the plurality of RTT measurements between the mobile device and the at least one AP.

Additional embodiments may function where the instructions further cause the mobile device comprising the processor to: identify a plurality of APs; and select the at least one AP from the plurality of APs. Additional embodiments may function where the at least one AP is selected from the plurality of APs based on a signal quality of the at least one AP. Additional embodiments may function where the at least one AP is selected from the plurality of APs based on a position of the at least one AP. Additional embodiments may function where the plurality of RTT measurements between the mobile device and at least one AP are collected without determining a processing delay associated with the AP.

Another embodiment may be a method comprising initiating, by a tracking system computer, a plurality of RTT measurements between a mobile device and at least one access point; analyzing the plurality of RTT measurements, and determining that the mobile device is in a stopped state based, at least in part, on the analyzing of the plurality of RTT measurements between the mobile device and the at least one AP. Additional embodiments may function where the tracking system computer receives the plurality of RTT measurements from the mobile device, and wherein the tracking system computer analyzes the plurality of RTT measurements and determines that the mobile device is in the stopped state. In still further embodiments, the tracking system computer may communicate the determination that the mobile device is in the stopped state to the mobile device. In further additional embodiments, the tracking system computer may initiate the plurality of RTT measurements by communicating with the at least one AP. In further embodiments, the tracking system computer may receive the plurality of RTT measurements from the at least one AP. In still further embodiments, the tracking system computer may initiate SPS measurements of a local device, and determine that the mobile device is in a stopped state using the SPS measurements in addition to the plurality of RTT measurements.

Further embodiments will be apparent in view of the description below.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A describes aspects of one embodiment of a method for measuring whether a device is in a stopped state using RTT measurements;

FIG. 2B describes aspects of one embodiment of a method for measuring whether a device is in a stopped state using RTT measurements;

DETAILED DESCRIPTION

Figure 1:
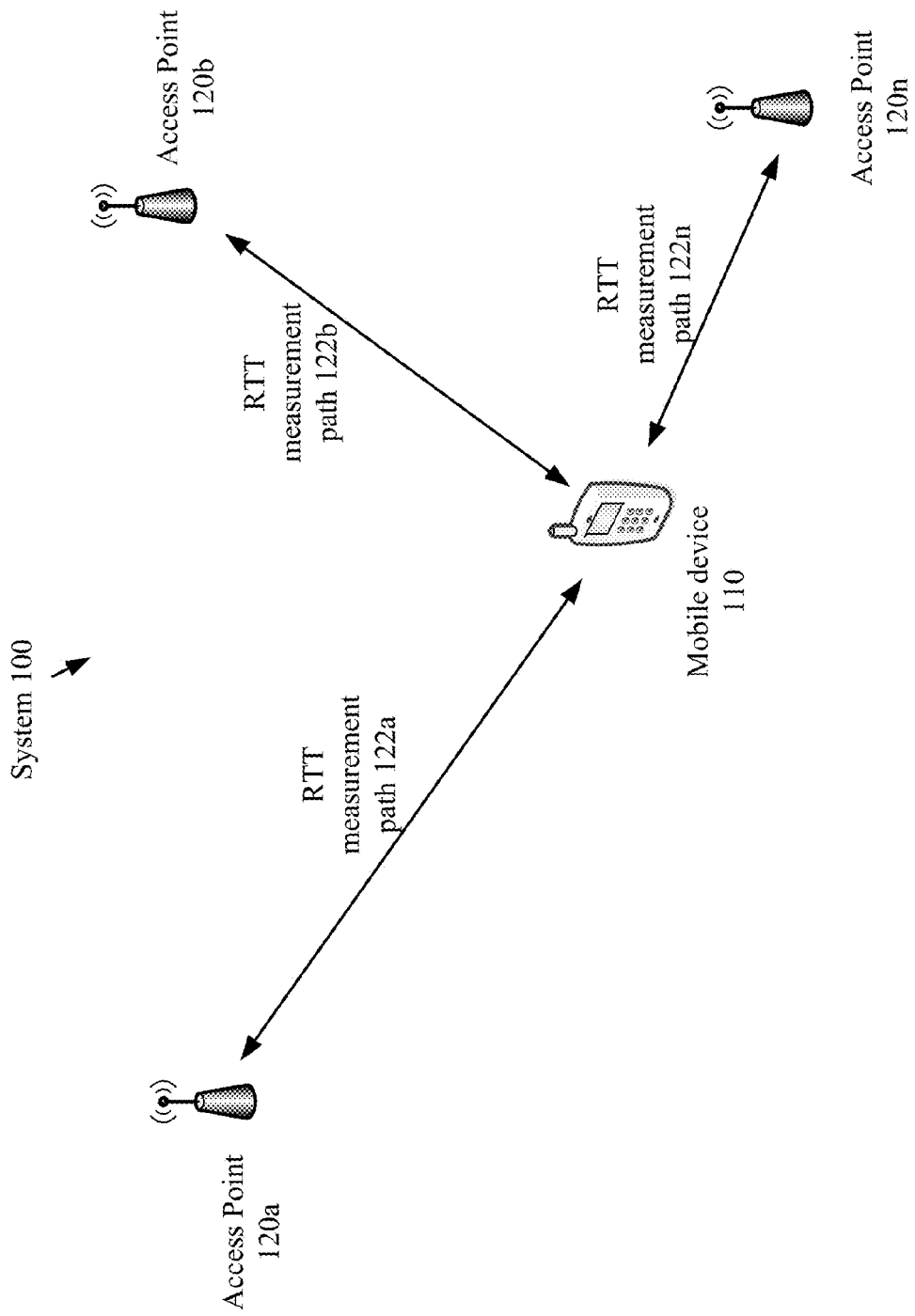
FIG. 1 describes one embodiment of a system for measuring whether a device is in a stopped state using RTT measurements.

Aspects of the disclosure relate to networked computing technologies and location measurements. In particular, aspects of the disclosure relate to systems, methods, apparatus, and computer-readable media for determining whether a device is in a stopped state using RTT measurements.

Embodiments described herein provide for the use of RTT measurements or deltaRTT measurements between a mobile device and an access point (AP) to determine when a device is moving relative to the stationary AP. A "stopped state" is a device state which is selected based on an analysis of movement data. A device need not be absolutely stationary in order to be considered in a stopped state. Instead, a stopped state may be considered an estimate of device environment. For example, a device may be in a stopped state if a user is standing and shifting weight between feet. Even though the device may be moving, the movement may be small compared to walking or running.

To determine a stopped state, a number of APs may be used in conjunction with measurements for a single device. Because RTT measurements will not change when a device is moving in a circle around an AP, the use of multiple APs may provide improved reliability for the determination of whether a device is stopped. Further, additional embodiments may use other sources of movement information from local device measurements such as accelerometer measurements, as well as from other location services such as satellite-based global positioning services. Any of these measurements may be combined with RTT measurements to determine whether the device is in a stopped state, and may further be filtered with various filtering embodiments described herein to additionally improve the performance of a system to determine a stopped state for a mobile device.

As mentioned above, embodiments described herein use RTT measurements. Round trip time measurements are a pseudo-range measurement based on the time elapsed between the departure time of a probe packet sent by a mobile device and the reception time of the acknowledgment sent by the AP. Such an RTT measurement is approximately equal to twice the time-of-flight of light between the mobile and the AP, plus a processing delay at the AP. For APs with MAC-layer processing in hardware, the processing delay is approximately constant. The delay time for a particular AP can either be pre-determined via factory calibration or learnt over time during the course of positioning. For embodiments described herein that are concerned with a change in RTT measurement, the processing delay may be ignored as long as any change in the processing delay is small relative to a movement threshold for determining a stopped state. If additional distance measurements are involved in certain embodiments, the delay may be subtracted out to get an approximate estimate of the distance between the mobile and the AP. The estimate will be approximate due to errors in processing delay estimation, as well as due to issues of multipathing in indoor propagation.

FIG. 1 describes a basic system 100 for determining a stopped state for a mobile device 110. FIGS. 2A and 2B describe corresponding methods that may be used with such a system 100. The system 100 includes both the mobile device 110 and at least one AP 120, with APs 120a, 120b, and 120n shown. Any number of APs may be used. In certain embodiments, a mobile device may have a threshold number of APs, such that if the device is within range of more than the threshold number of APs, the device will select among the available APs to determine which APs to use for RTT measurements.

Once the system is operating, mobile device 110 will take repeated RTT measurements, or change in RTT (deltaRTT) measurements with the selected APs. This is reflected in 222 of FIGS. 2A and 2B as collecting a plurality of RTT measurements between a mobile device 110 and at least one AP 120. As shown in FIG. 1, the RTT measurement occurs over an RTT measurement path, with RTT measurement paths 122a, 122b, and 122n from mobile device 110 to respective APs 120a, 120b, and 120n.

The measurement of a change in RTT from the mobile device to an AP essentially only measures the radius of a circle from each AP to the mobile device. This may also be considered as the change in length of a vector from each AP to the corresponding mobile device. Considering the APs of FIG. 1, if mobile device 110 is moving toward AP 120b while measuring the change in RTT to APs 120a and 120n, the change in RTT for these measurements along RTT measurement paths 122a and 122n will be small. The change in RTT with measurements from mobile device 110 to AP 120b, however, will be roughly equal to the actual movement of the device because the device is moving directly toward AP 120b. Because of this, the best results will be achieved with a sufficient number of APs such that the mobile device 110 will not be moving on a path that circles all of the measured APs. In certain embodiments, information about the actual location of the APs may be used to ensure that the best APs are selected for RTT measurements.

In 204 of FIG. 2A, the data collected as part of the RTT measurements is analyzed. This analysis may include various types of filtering and processing such as particle or Kalman filtering. In 206, a determination is made that the device is in a stopped state based at least in part on the analysis of the plurality of RTT measurements.

FIG. 2B provides additional details which may be included in certain embodiments. 202 of FIG. 2B is the same as 202 of FIG. 2A, where RTT measurements are collected. In 224 of FIG. 2B, the data collected as part of the RTT measurements is used to determine a change in RTT. This is used for determining that the mobile device is in a stopped state by analyzing the plurality of RTT measurements between the mobile device 110 and the at least one AP 120. While in the simplest embodiment, this determination of a stopped state may be based purely on the change in RTT measured from the mobile device 110 to at least one AP 120, various optional alternatives may be incorporated into certain embodiments described by 224a-c.

As illustrated by 224a, a threshold may be used for determination of what is meant by a "stopped state." In certain embodiments, this threshold may be determined by a user selection in an interface of the mobile device. Such a threshold may be any static value compatible with the signal strength of the AP and the sensitivity of the RTT measurement. Non-limiting examples may be 5 cm of absolute displacement over 3 seconds, 5 m of displacement over 10 seconds, 10 m of absolute displacement with no set time restriction, or any other such threshold. In alternative embodiments, the threshold may be a dynamic value based on the number of APs available for RTT measurements, or some other environmental factor associated with the mobile device 110 during RTT measurement such as the noise associated with a measurement. As illustrated by 224b, RTT data may be combined with a variety of other movement data. Examples of such additional data may be GNSS positioning data, received signal strength indication (RSSI) changes, accelerometer measurements, barometer measurements for changes in height, and any other such potential source of information. In such embodiments, the information may be combined to arrive at a determination of whether the device is in a stopped state. As illustrated by 224c, particular filtering may be used to improve the stopped state determination. For example, data may be filtered to remove outliers and prevent the stopped state from changing rapidly. Particle filters, Kalman filters, and motion models may all be used for this type of improvement to the raw RTT data in order to improve or customize a system's identification of a stopped state for a mobile device.

Figure 3:
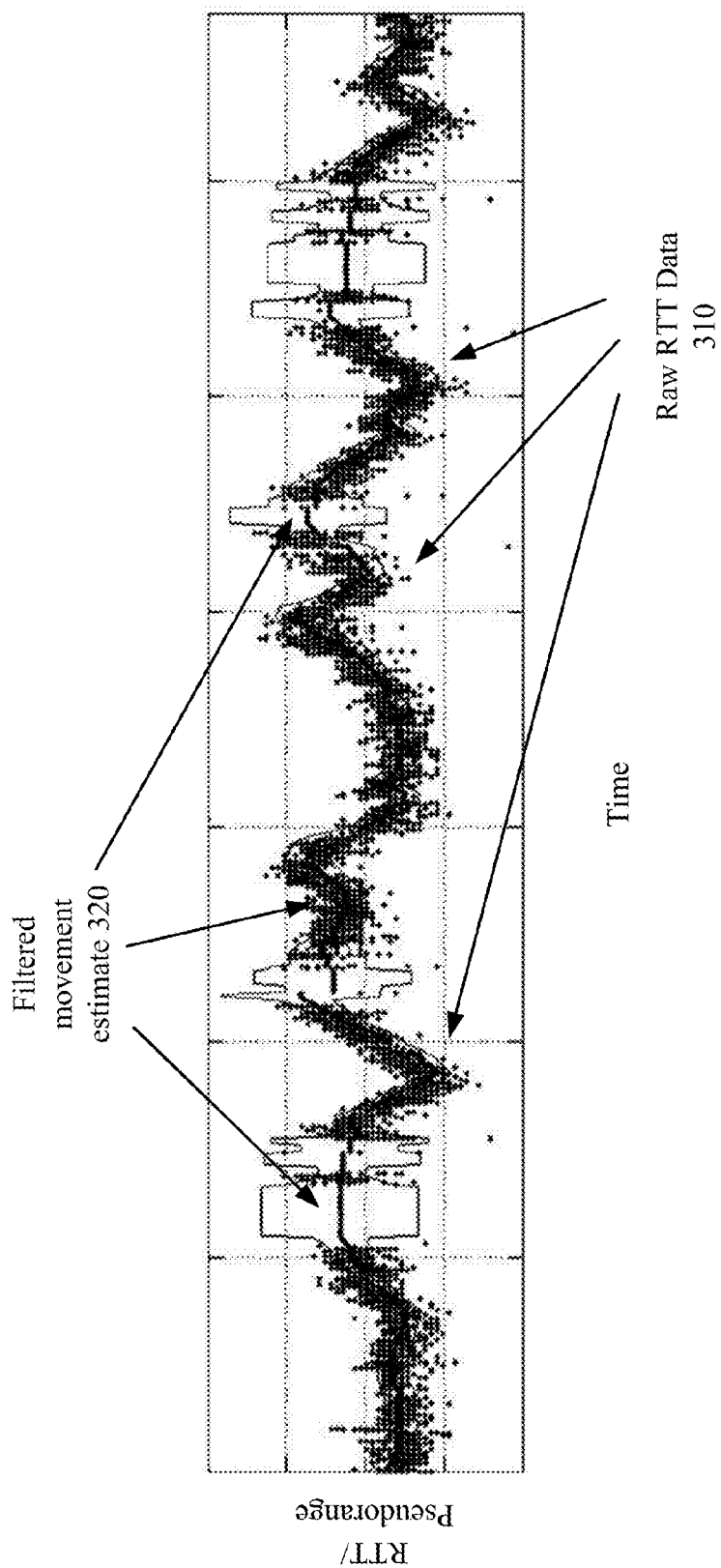
FIG. 3 describes one embodiment of RTT data that may be used in accordance with various embodiments.

FIG. 3 then shows one potential example of RTT measurement data that may be used in order to make a stopped state determination. FIG. 3 shows an example of RTT measurements taken over time between a single mobile device such as mobile device 110 and a single AP such as AP 120a, with raw RTT data 310 and a filtered movement estimate 320 both shown. Filtered movement estimate 320 may be created in any acceptable filtering manner. This includes any filtering as described above in 224c. In various embodiments, the filtered movement estimate 320 may simply be a filter applied to raw RTT data 310 to remove the signal noise. In another embodiment, RTT measurements and RSSI measurements may be used in conjunction. RTT and RSSI measurements both change based on mobile device movement and path geometry changes for the radio frequency (RF) signals used for measurement. Because of this, RTT and RSSI measurements particularly may be filtered in view of these similarities.

In other embodiments, additional movement data as described above in 224b may be included in filtered movement estimate 320, and may be used to determine when the device is in a stopped state. For example, a Kalman filter or linear quadratic estimation may be used with a plurality of different sets of data for movement over time. Such a filter may be used in one potential embodiment with RTT measurements, RSSI measurements, acceleration data, and tuning parameters to create an estimate of movement. A threshold may be applied to the output of the Kalman filter in order to determine whether the device is in a stopped state.

In certain embodiments, a threshold may then be set at a given time, with a stopped state elected as long as the filtered movement estimate 320 does not change more than the threshold amount. In further embodiments, the threshold amount may be set to change over time, such that the mobile device is considered to be in a stopped state as long as the maximum variation of the filtered movement estimate 320 does not exceed a threshold amount over a particular time frame. In still further embodiments, any other static or dynamic threshold may be used based on a user selection or a system setting in order to identify a stopped state of the device.

Figure 4:
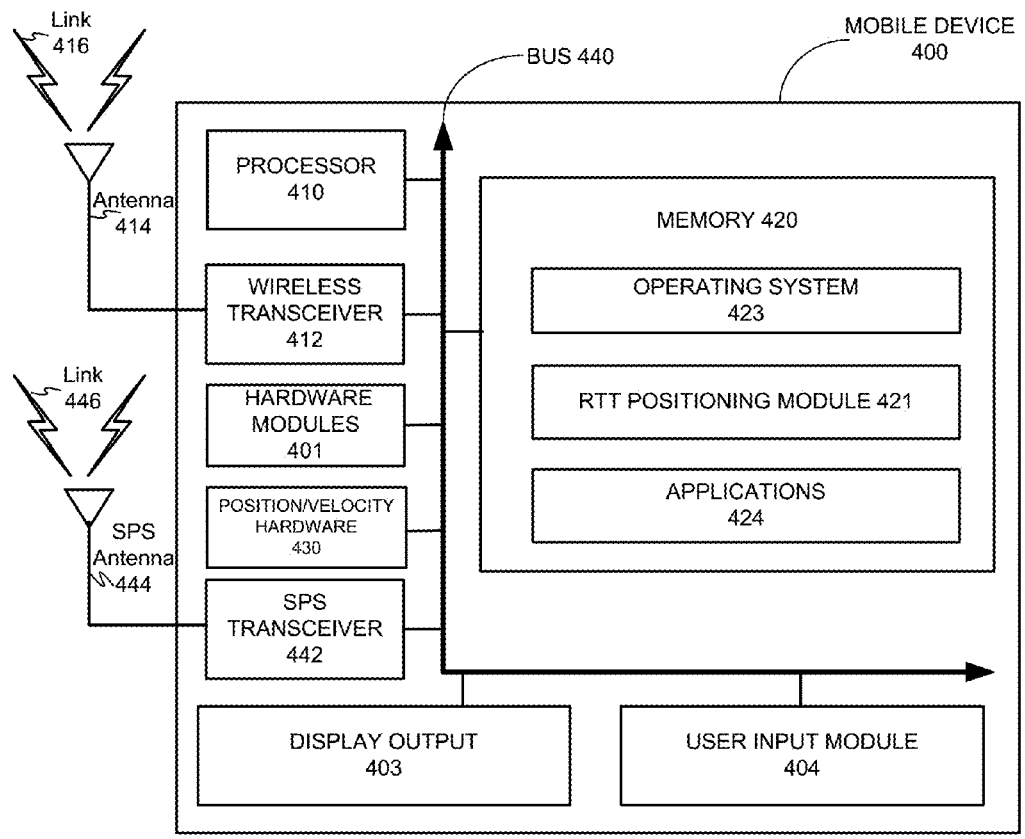
FIG. 4 is one potential example of a mobile device for use with different embodiments.

FIG. 4 shows one potential implementation of a mobile device 400 that may be similar to mobile device 110 of FIG. 1. Further, mobile device 400 may also implement processing for initiating RTT measurements, deltaRTT measurements, and other measurements that may be used to determine a stopped state according to the embodiments described herein. Additional details of such processes may be initiated and managed by RTT positioning module 421. In certain of such embodiments, the entire process of collecting RTT data and analyzing the data to determine that mobile device 400 may be performed by mobile device 400 with no specialized processing from any other device. In alternate embodiments, the RTT measurements may be remotely imitated by a positioning server and created in conjunction with RTT positioning module 421 and remote networked elements as described in FIG. 6.

In the embodiment shown at FIG. 4, mobile device 400 includes processor 410 configured to execute instructions for performing operations at a number of components and can be, for example, a general-purpose processor or microprocessor suitable for implementation within a portable electronic device. Processor 410 is communicatively coupled with a plurality of components within mobile device 400. To realize this communicative coupling, processor 410 may communicate with the other illustrated components across a bus 440. Bus 440 can be any subsystem adapted to transfer data within mobile device 400. Bus 440 can be a plurality of computer buses and include additional circuitry to transfer data.

Memory 420 may be coupled to processor 410. In some embodiments, memory 420 offers both short-term and long-term storage and may in fact be divided into several units. Memory 420 may be volatile, such as static random access memory (SRAM) and/or dynamic random access memory (DRAM), and/or non-volatile, such as read-only memory (ROM), flash memory, and the like. Furthermore, memory 420 can include removable storage devices, such as secure digital (SD) cards. Thus, memory 420 provides storage of computer-readable instructions, data structures, program modules, and other data for mobile device 400. In some embodiments, memory 420 may be distributed into different hardware modules.

In some embodiments, memory 420 stores a plurality of application modules 421 and 424, which may be any number of applications 424. RTT positioning module 421 may work in conjunction with any number of other applications 424 as part of a device which determines a stopped state. Applications as stored in a non-transitory memory such as memory 420 contain particular instructions to be executed by processor 410. In alternative embodiments, other hardware modules 401 may additionally execute certain applications 424 or parts of applications. In certain embodiments, memory 420 may additionally include secure memory, which may include additional security controls to prevent copying or other unauthorized access to secure information such as secure locations of bases stations that is not public or not expected to be shared outside of a secure environment.

In some embodiments, memory 420 includes an operating system 423. Operating system 423 may be operable to initiate the execution of the instructions provided by application modules and/or manage other hardware modules 401 as well as interfaces with communication modules which may use wireless transceiver 412 and to receive information from link 416 via antenna. Operating system 423 may be adapted to perform other operations across the components of mobile device 400 including threading, resource management, data storage control and other similar functionality.

In additional embodiments wireless transceiver 412 may receive information from link 416 via antenna 414 which may be passed directly to position/velocity hardware 430 which may include specialized hardware, software, or firmware modules for RTT measurements, Doppler measurements, position determination, acceleration determination, or velocity determination. In alternative embodiments, signals from antennas may be communicated to a memory 420 for later access and processing by processor 410 executing RTT positioning module 421 to determine a stopped state in accordance with the embodiments described herein.

Additional embodiments may also include satellite power system (SPS) antenna 444 coupled to SPS transceiver 442 to receive satellite signals over link 446. Such signals may be used to improve positioning in conjunction with other positioning signals described herein. In still further embodiments, specialized modules may implement communications which are integrated with RTT measurements. For example, in certain embodiments, the wireless transceivers may receive signals associated with a particular communications standard. Such signals may include known standard reference signals which may provide standardized non-data reference signals which may be adapted for assistance in determining whether a device is in a stopped state in accordance with other positioning measurements. Certain standards, for example, non-data reference signals such as a Positioning Reference Signal (PRS), a Cell Specific Reference Signal (CRS), a primary synchronization signal (PSS), or a secondary synch signal (SSS). PRS, CRS, PSS, SSS signals, as one potential example, are illustrated by standard 3GPP 36.211 V10.0.0 (2011-01). Other communication systems such as code division multiple access systems may use pilot reference signals that may be incorporated with positioning systems for use in determining whether mobile device 400 is in a stopped state. Other signals may be received as part of an implementation of GNSS or satellite positioning, or provided as part of a communication system such as a clock frequency referenced off of a WAN signal. In various embodiments, mobile device 400 may include GNSS clock circuitry, support hardware, and other functionality.

In some embodiments, mobile device 400 includes a plurality of other hardware modules 401. Each of other hardware modules 401 is a physical module within mobile device 400. However, while each of hardware modules 401 is permanently configured as a structure, a respective one of hardware modules 401 may be temporarily configured to perform specific functions or temporarily activated. A common example is an application 424 that may program a camera module (i.e., hardware module) for shutter release and image capture. A respective one of hardware modules 401 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth® transceiver, a cellular transceiver, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some embodiments, one or more functions of the hardware modules 401 may be implemented in software, firmware, or any combination of such.

In certain embodiments, hardware modules 401 and/or position/velocity hardware 430 may include specialized functionality for determining the velocity of mobile device 400 as part of an embodiment for determining a stopped state of mobile device 400. Such components may be accelerometers, inertial sensors, gyroscopes, or other such devices described above which are configured to work alone or in combination to provide accurate velocity measurements in conjunction with corresponding RTT measurements and RTT positioning module 421.

Mobile device 400 may include a component such as a wireless communication module which may integrate antenna 414 and wireless transceiver 412 with any other hardware, firmware, or software necessary for wireless communications. Such a wireless communication module may be configured to receive signals from various devices such as data sources via networks and access points. In addition to other hardware modules 401 and applications 424 in memory 420, mobile device 400 may have a display module 403 and a user input module 404. Display module 403 graphically presents information from mobile device 400 to the user. This information may be derived from one or more applications 424, one or more hardware modules 401, a combination thereof, or any other suitable means for resolving graphical content for the user (e.g., by operating system 423). Display module 403 can be liquid crystal display (LCD) technology, light-emitting polymer display (LPD) technology, or some other display technology. In some embodiments, display module 403 is a capacitive or resistive touch screen and may be sensitive to haptic and/or tactile contact with a user. In such embodiments, the display module 403 can comprise a multi-touch-sensitive display. Display output 403 may then be used to settings, output information, or other user interface components of RTT positioning module 421. In various embodiments, when a determination is made that the mobile device 400 is in a stopped state, as described by element 206 of FIG. 2A, this determination may be output on display output 403. Alternatively, mobile device 400 may have a set of interface or display systems which are altered, so that a particular user interface is displayed following or during a determination that mobile device 400 is in a stopped state. As part of the stopped state determination, mobile device may identify the current interface being presented on display output 403, and if the current interface is not the interface associated with a stopped state, aspects of RTT positioning module 421 or another application 424 may automatically adjust the information presented on display output 403 to a stopped state interface.

Additional potential embodiments of a mobile device may further comprise various portions of computing devices as are detailed below with respect to FIG. 7 and networks as detailed in FIG. 8.

Figure 5:
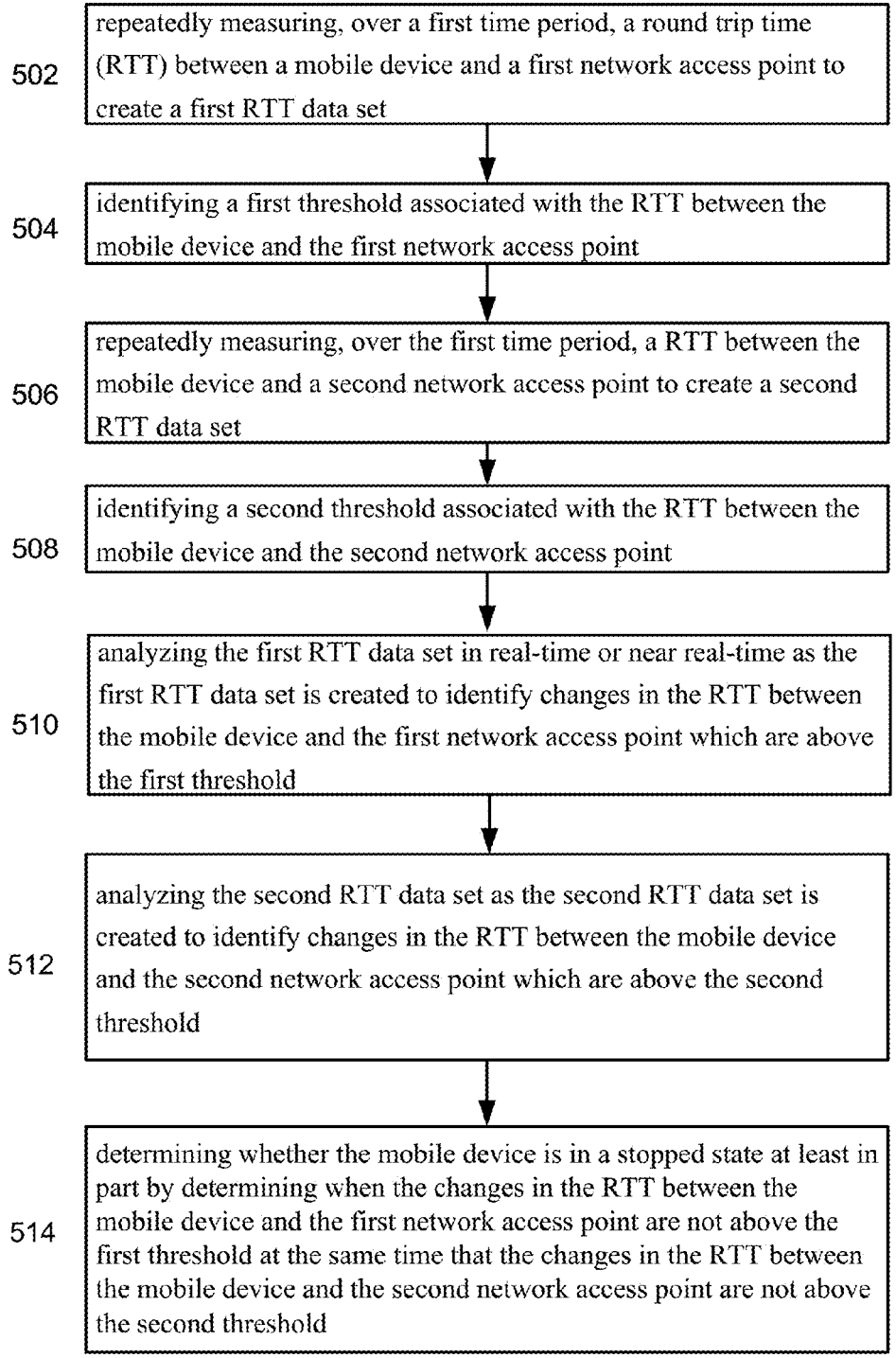
FIG. 5 describes one embodiment of a method for measuring whether a device is in a stopped state using RTT measurements.

FIG. 5 now shows one potential additional method of stopped stated detection. The method of FIG. 5 may particularly require a plurality of APs in order to determine if a device is in a stopped state in a two-dimensional single floor area. In further alternative embodiments with a multi-level environment with APs on multiple floors, three APs may be required to determine if the mobile device is moving in three dimensions. This may include movement on escalators, elevators, and up and down movement. In some embodiments, RTT measurements may be used for two-dimensional movement on a single floor of an environment, with data from other sensors such as a barometer used for determination of up and down movement.

In 502, a method begins with repeatedly measuring, over a first time period, a round trip time (RTT) between a mobile device and a first network access point to create a first RTT data set. In 504, the method continues with identifying a first threshold associated with the RTT between the mobile device and the first network access point. In such an embodiment, the threshold may be associated with a single set of measurements between a mobile device such as mobile device 110 and a particular AP such as AP 120a. 506 then involves repeatedly measuring, over the first time period, a RTT between the mobile device and a second network access point to create a second RTT data set. 508 involves identifying a second threshold associated with the RTT between the mobile device and the second network access point. These measuring and threshold identification steps may be repeated for any number of sets of RTT measurements for different APs. 510 involves analyzing the first RTT data set in real-time or near real-time as the first RTT data set is created to identify changes in the RTT between the mobile device and the first network access point which are above the first threshold. This may enable a device to present a stopped state result to a user of the mobile device as the determination is made. 512 similarly involves analyzing the second RTT data set in real-time or near real-time as the second RTT data set is created to identify changes in the RTT between the mobile device and the second network access point which are above the second threshold. This analysis of the first and second sets of RTT data may then be used in 514 in determining whether the mobile device is in a stopped state at least in part by determining when the changes in the RTT between the mobile device and the first network access point are not above the first threshold at the same time that the changes in the RTT between the mobile device and the second network access point are not above the second threshold.

In other embodiments, any number of APs may be used, and any combination of multiple thresholds on a per AP level, a per measurement type level, an overall filtering combination level. This may result in conflicting information on determination of a stopped state. In certain embodiments, rules may be set for priority determinations based on more reliable measurements. In other embodiments, any determination that a device is not in a stopped state may cause the device to determine that it is not in a stopped state.

Figure 6:
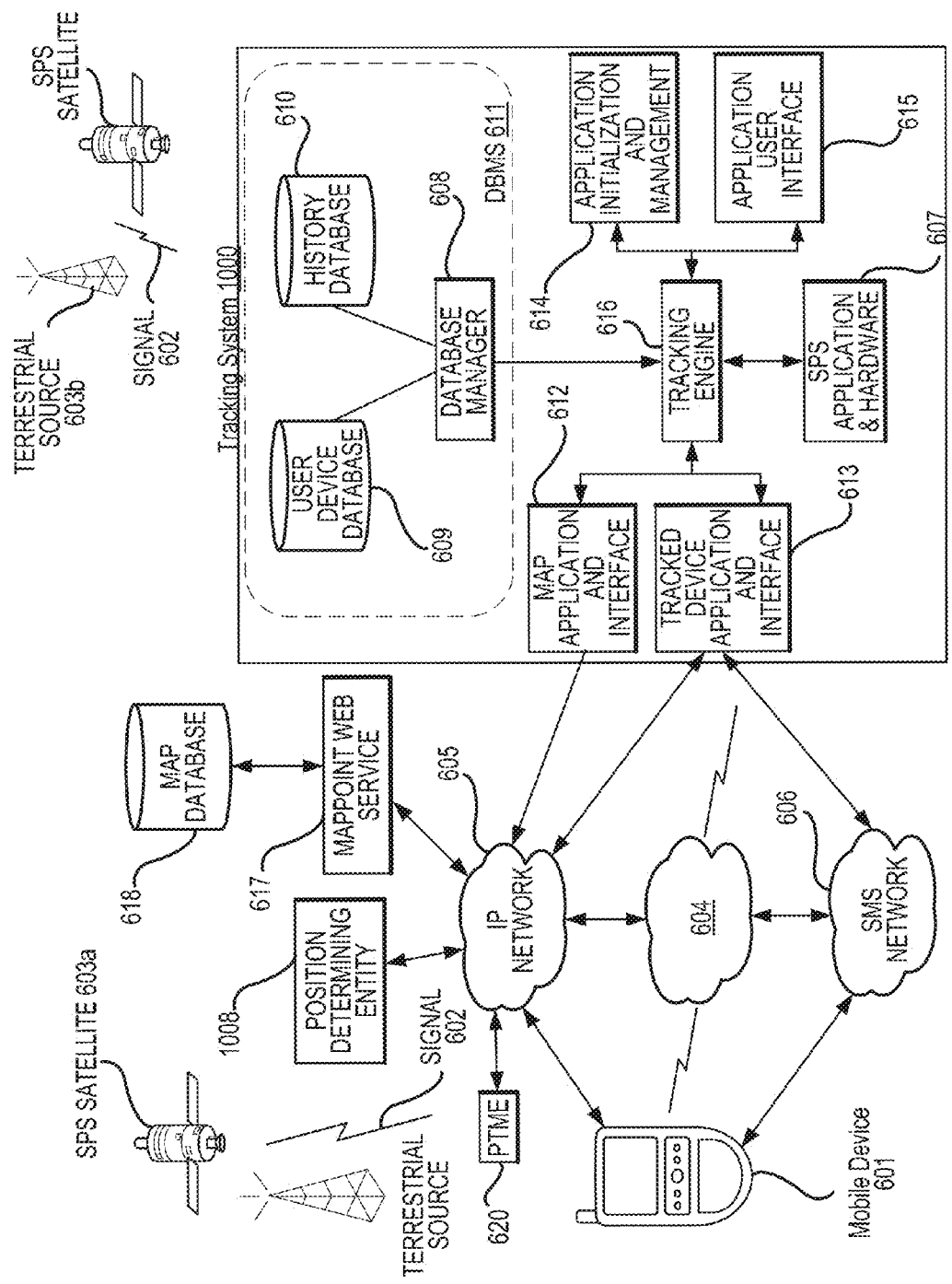
FIG. 6 describes one embodiment of a system for measuring whether a device is in a stopped state using RTT measurements.

FIG. 6 is a block diagram illustrating an exemplary architecture of a wireless system which includes a mobile device 601 and a tracking system 1000. In certain embodiments, tracking system 1000 may work in conjunction with mobile device 601 to determine if device 601 is in a stopped state. The depicted geometry may be adapted to perform any one of the exemplary flow diagrams of FIG. 2A-B or 5, or any number of other processes within the scope of this disclosure. One skilled in the art would understand that FIG. 6 presents one combination and ordering of the blocks. Various other combinations and orderings of the blocks presented in FIG. 6 will be readily apparent to those skilled in the art without departing from the spirit or scope of the disclosure.

In one aspect, the mobile device 601, for example, comprises an LDC ("Low Duty Cycle") transceiver. In another aspect, the mobile device 601 may also comprise a mobile phone, a mobile station (MS), user equipment (UE), a personal digital assistant (PDA), a personal navigation device (PND, a tablet, a phablet, a laptop, or any other mobile computing device. This list is by example and is not limiting in any way. Selection of the mobile device 601 is a system parameter that may be selected by the user, another operator or the system designer.

In one aspect, the tracking system 1000 represents a wireless mobile device capable of storing and executing applications, such that it may be a mobile device used to determine that another mobile device is in a stopped state. One of ordinary skill in the art would recognize that the tracking system 1000 and its configuration as shown in FIG. 6 could also be the configuration of the mobile device 601. In another aspect, the tracking system 1000 is an LDC transceiver.

In one example, the tracking system 1000 comprises an SPS application and hardware 607 which receives the RTT which are made by device 601. In such an embodiment, the stopped state may not be presented to the mobile device 601 at all, but instead may only be presented to tracking system 1000. A database manager 608, a user device database 609 and/or a history database 610 comprise a Database Management System ("DBMS") 611 within the tracking system 1000. The DBMS 611 provides storage for map display, data associated with the various devices and stopped state thresholds. Additionally, the DBMS 611 may also provide storage for system applications that run on the tracking system 1000. In one example, the tracking system 1000 includes an application initialization and management unit 614 and an application user interface unit 615. Working in conjunction, the application initialization and management unit 614 and the application user interface unit 615 initialize, control and manage system applications that run on the tracking system 1000. The tracking system 1000 may implement this functionality in any operating system. One skilled in the art would understand that the operating systems listed are merely examples and that other operating systems may be used without affecting the spirit and scope of this disclosure. Alternatively, all or some of the initialization, control and management of applications may be performed separately from the specific operating system present in the tracking system 1000. In one example, a tracking engine 616 is connected to the database manager 608, the application initialization & management unit 614, the application user interface unit 615, the map application & interface unit 612 and the tracked device application & interface unit 613. The tracking engine 616, for example, may determine particular thresholds for a stopped state, such as particular movement or location areas associated with certain RTT measurements or deltaRTT measurements. In one aspect, the tracking engine 616, in conjunction with the internal chipset of the tracking system 1000, synthesizes the data obtained and displays a map to show the movement of mobile device 601. One skilled in the art would understand that the components within the tracking system 1000 (as shown in FIG. 6) are provided only as examples. The tracking system 1000 can include other components not shown in FIG. 6 or not include some of the components shown in FIG. 6 without departing from the spirit and scope of the disclosure.

In one aspect, the processing unit includes one or more of the following: database manager 608, user device database 609, history database 610, application initialization and management unit 614, application user interface unit 615, map application and interface unit 612, tracked device application and interface unit 613, tracking engine 616 or SPS application and hardware 607.

As shown in FIG. 6, the mobile device 601 is connected to a mobile network 604. The mobile network 604, which is used in one aspect to relay information to and from the mobile device 601, may comprise of CDMA, TDMA, GSM or any other wireless air interfaces. Also, in one aspect, the mobile network 604 is connected to an IP ("Internet Protocol") network 605 and an SMS ("Short Message Service") network 606. In other embodiments, other network connections may use means such as signal 602 operating via satellite 603*a* or terrestrial source 603*b*. The IP network 605 may include a plurality of APs for performing RTT measurements with mobile device 601. IP network 605 may also function as a system by which data is sent from one host to another host via a network (e.g., the Internet). The SMS network 606 sends short text messages between devices. In one aspect, the mobile network 604 relays data from the mobile device 601 to the IP network 605 and the SMS network 606. In another aspect, the mobile device 601 is directly connected to the IP network 605 and to the SMS network 606, as shown in FIG. 6. In one aspect, the tracking system 1000 is similarly connected to the mobile network 604, the IP network 605 and/or the SMS network 606. Or, the tracking system 1000 may be connected to the IP network 605 and SMS network 606 through the mobile network 604. The connection of mobile device 601 and tracking system 1000 to one or more of the mobile network 604, SMS network 606 or IP network 605 allows for the flexibility of relaying information between devices.

In one example, mobile device 601 (through its RTT positioning module or other such tracking modules) is connected to the IP network 605. Mobile device 601 may also be connected to the mobile network 604. A Mappoint Web Service 617 is also connected to the IP network 605 or the mobile network 604. Stopped state data, raw RTT measurements, filtered movement estimates, or any combination thereof may be sent to the Mappoint Web Service 617 which is then able to relay information from its map database 618 to the tracking system 1000. Additionally, stopped state data can be relayed via the IP network 605 or the mobile network 604 from the mobile device 601 or the position determining entity 1008 to the tracking system 1000.

In one example, the mobile device 601 sends an SMS text message via the SMS network 606 or the mobile network 604 to the tracking system 1000 or vice versa. Alternatively, the position tracking management entity (PTME) 620 may send an SMS text message to the tracking system 1000 or mobile device 601. PTME 620 may be a third party system providing details, controls, or information to initiate stopped state detection or to receive stopped state information for a mobile device 601. Upon receiving the SMS text message, the tracking system 1000 may initiate a stopped state measurement on mobile device 601, and may return the results of the stopped state measurement to the PTME 620.

Figure 7:
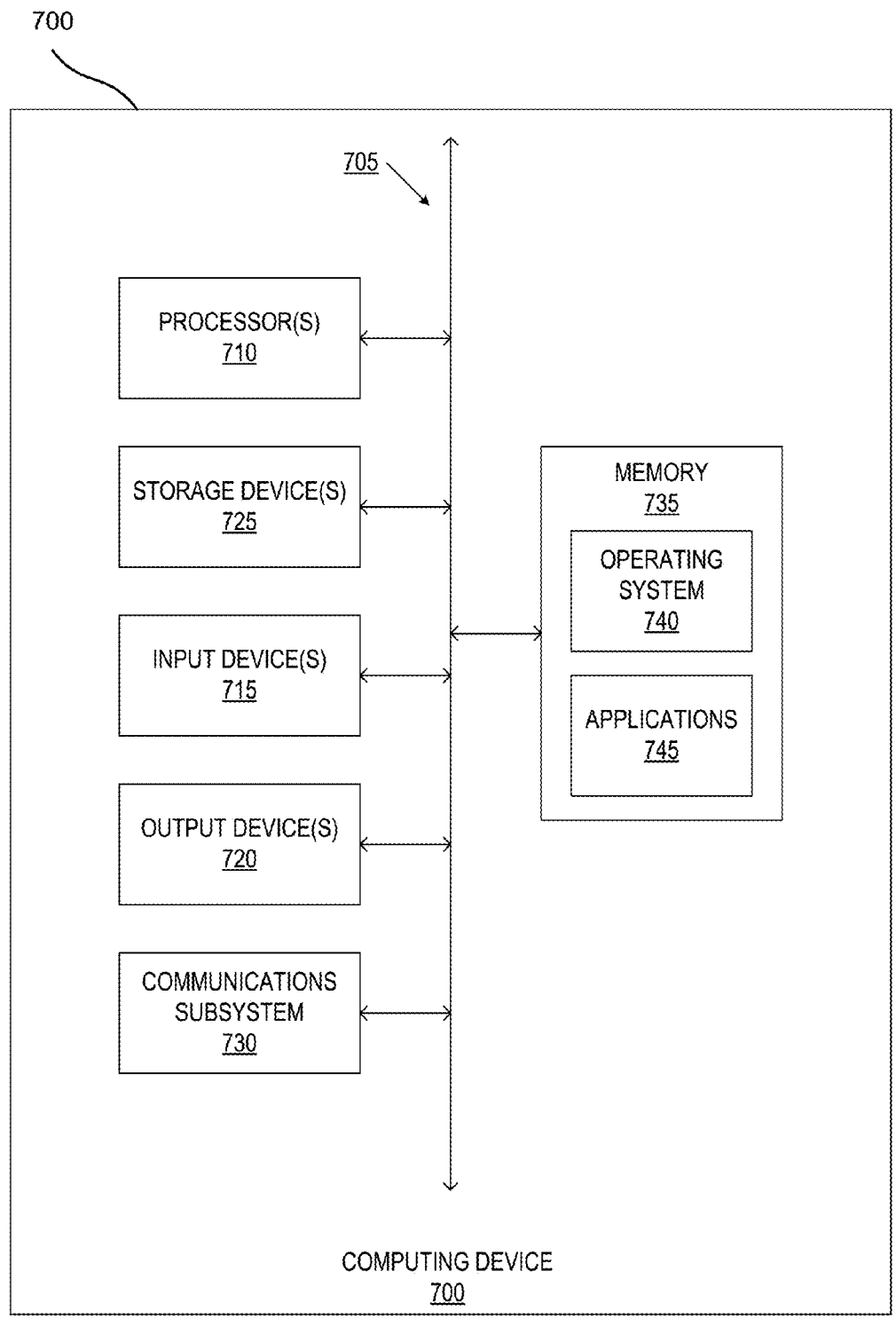
FIG. 7 is one potential implementation of a computer device according to certain embodiments.

FIG. 7 provides a schematic illustration of one embodiment of a computing device 700 that can perform the methods provided by various other embodiments such as the embodiments described by FIGS. 1-3 as described herein. Elements of FIG. 7 may be used as part of any device or component described herein. For example, device 700 may describe aspects of APs 120*a-c*, mobile device 110, tracking system 1000, mobile device 601, or any other communications component needed for a network device or network component described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner, and describes elements that may implement specific methods according to embodiments of the invention when, for example, controlled by computer-readable instructions from a non-transitory computer-readable storage device such as storage device(s) 725.

The computing device 700 is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, and/or the like); one or more input devices 715, which can include, without limitation, a mouse, a keyboard and/or the like; and one or more output devices 720, which can include, without limitation, a display device, a printer and/or the like.

The computing device 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computing device 700 might also include a communications subsystem 730, which can include, without limitation, a modem, a network card (wireless or wired), an infrared communication device, a wireless communication device and/or chipset (such as a Bluetooth device, a 802.11 device, a Wi-Fi device, a WiMax device, cellular communication facilities, etc.), and/or similar communication interfaces. The communications subsystem 730 may permit data to be exchanged with a network (such as the network described below, to name one example), other computer systems, and/or any other devices described herein. A mobile device such as mobile device 400 may thus include other communication subsystems in addition to those including wireless transceiver 412.

In many embodiments, the computing device 700 will further comprise a non-transitory working memory 735, which can include a RAM or ROM device, as described above. The computing device 700 also can comprise software elements, shown as being currently located within the working memory 735, including an operating system 740, device drivers, executable libraries, and/or other code, such as one or more applications 745, which may comprise computer programs provided by various embodiments, and/or may be designed to implement methods, and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general-purpose computer (or other device) to perform one or more operations in accordance with the described methods for using RTT measurements to determine a stopped state.

A set of these instructions and/or code might be stored on a computer-readable storage medium, such as the storage device(s) 725 described above. In some cases, the storage medium might be incorporated within a computer system, such as computing device 700. In other embodiments, the storage medium might be separate from a computer system (e.g., a removable medium, such as a compact disc), and/or provided in an installation package, such that the storage medium can be used to program, configure and/or adapt a general-purpose computer with the instructions/code stored thereon. These instructions might take the form of executable code, which is executable by the computing device 700 and/or might take the form of source and/or installable code, which, upon compilation and/or installation on the computing device 700 (e.g., using any of a variety of generally available compilers, installation programs, compression/decompression utilities, etc.) then takes the form of executable code. RTT positioning module 421 may thus be executable code as described herein.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. An activity selection subsystem configured to provide some or all of the features described herein relating to the selection of acceptable characteristics for an output 3D image created from multiple two-dimensional sources, and such subsystems comprise hardware and/or software that is specialized (e.g., an application-specific integrated circuit (ASIC), a software method, etc.) or generic (e.g., processor(s) 710, applications 745 which may, for example, implement any module within memory 735, etc.) Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using the computing device 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including, but not limited to, non-volatile media, non-transitory media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Any such memory may function as memory 735 or as secure memory if structured to maintain security of stored content.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

Thus, in certain embodiments, computing device 700 may be configured to or may operate to collect a plurality of RTT measurements with at least one AP; analyze the plurality of RTT measurements; and determining that the computing device 700 is in a stopped state based, at least in part, on the analyzing of the plurality of RTT measurements between the computing device 700 and the at least one AP.

In various embodiments as described herein, computing devices may be networked in order to communicate information. For example, mobile device 400 may be networked to receive information as described above. Additionally, each of these elements may engage in networked communications with other devices such as web servers, databases, or computers which provide access to information to enable applications via network.

Figure 8:
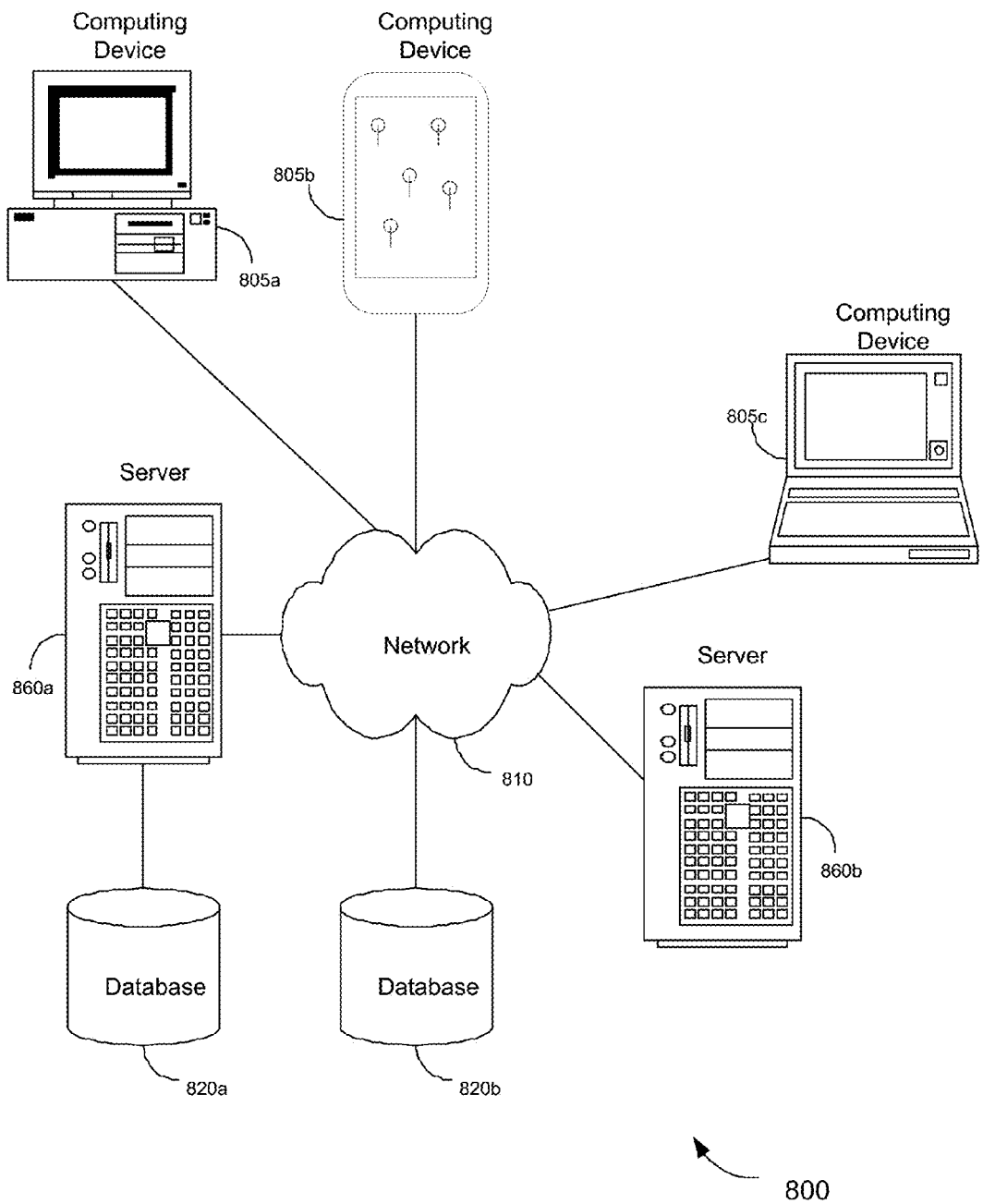
FIG. 8 is one potential implementation of a networked computer system according to certain embodiments.

FIG. 8 illustrates a schematic diagram of a system 800 of networked computing devices that can be used in accordance with various embodiments to enable systems such as system 800 or other systems that may RTT measurements to identify a device stopped state. For example, in various embodiments, the output location information may be communicated via networked computers to one or more databases as described by system 800. The system 800 can include one or more user computing devices 805. The user computing devices 805 can be general-purpose personal computers (including, merely by way of example, personal computers and/or laptop computers running any appropriate flavor of Windows® and/or Mac OS® operating systems) and/or workstation computers running any of a variety of commercially-available UNIX® or UNIX-like operating systems. These user computing devices 805 can also have any of a variety of applications, including one or more applications configured to perform methods of the invention, as well as one or more office applications, database client and/or server applications, and web browser applications. Alternatively, the user computing devices 805 can be any other electronic device, such as a thin-client computer, Internet-enabled mobile telephone, and/or personal digital assistant (PDA), capable of communicating via a network (e.g., the network 810 described below) and/or displaying and navigating web pages or other types of electronic documents. Although the exemplary system 800 is shown with three user computing devices 805a-c, any number of user computing devices can be supported.

Certain embodiments of the invention operate in a networked environment, which can include a network 810. The network 810 can be any type of network familiar to those skilled in the art that can support data communications using any of a variety of commercially-available protocols, including, without limitation, TCP/IP, SNA, IPX, AppleTalk®, and the like. Merely by way of example, the network 810 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth protocol known in the art, and/or any other wireless protocol; and/or any combination of these and/or other networks. Network 810 may include access points such as an access point 120 for enabling access to network 810 by various computing devices.

Embodiments of the invention can include one or more servers 860. Each of the servers 860 may be configured with an operating system, including, without limitation, any of those discussed above, as well as any commercially (or freely) available server operating systems. Each of the servers 860 may also be running one or more applications, which can be configured to provide services to one or more user computing devices 805 and/or other servers 860.

Merely by way of example, one of the servers 860 may be a web server, which can be used, merely by way of example, to process requests for web pages or other electronic documents from user computing devices 805. The web server can also run a variety of server applications, including HTTP servers, FTP servers, CGI servers, database servers, Java® servers, and the like. In some embodiments of the invention, the web server may be configured to serve web pages that can be operated within a web browser on one or more of the user computing devices 805 to perform methods of the invention. Such servers may be associated with particular IP addresses, or may be associated with modules having a particular URL, and may thus store secure navigation modules which may interact with a mobile device such as mobile device 400 to provide secure indications of geographic points as part of location services provided to mobile device 400.

In accordance with further embodiments, one or more servers 860 can function as a file server and/or can include one or more of the files (e.g., application code, data files, etc.) necessary to implement methods of various embodiments incorporated by an application running on a user computing device 805 and/or another server 860. Alternatively, as those skilled in the art will appreciate, a file server can include all necessary files, allowing such an application to be invoked remotely by a user computing device 805 and/or server 860. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 860a (and/or a user computing device 805). Alternatively, a database 820b can be remote from any or all of the user computing devices 805 or servers 860a,b, so long as the database 820b can be in communication (e.g., via the network 810) with one or more of these. In a particular set of embodiments, a database 820 can reside in a storage-area network ("SAN") familiar to those skilled in the art. (Likewise, any necessary files for performing the functions attributed to the user computing devices 805 or servers 860 can be stored locally on the respective computer and/or remotely, as appropriate.) In one set of embodiments, the database 820 can be a relational database, such as an Oracle® database, that is adapted to store, update, and retrieve data in response to SQL-formatted commands. The database might be controlled and/or maintained by a database server, as described above, for example. Such databases may store information relevant to levels of security.

For example, in one potential embodiment, server 860a may be a server that stores a base station almanac in a database. Mobile devices practicing various embodiments as described herein may communicate the locations of one or more base stations to such a database via a network such as network 810. When the server receives the base station location information, the server may determine if any other information is already stored relating to the location of the particular base station. If there is no information about the base station in the database, a new entry may be created for the base station almanac with the base station location from the mobile device. If an entry is already present for the particular base station, a variety of different uses may be made of the information. In certain embodiments, the new information may be used to verify the previous information is correct. In other embodiments, if the new information conflicts with the previous information, a flag may be set that further information is needed.

In other alternative embodiments, the mobile device such as computing device 805*b* or computing device 805*c* may query such a database before measuring the base station location. A measurement may be taken only if no information is currently in the database. In still further embodiments, the mobile device may both query the database and take a measurement, but the measurement may only be sent to the database if the mobile device receives a message that there is no current base station location stored, or if the currently stored base station information conflicts with the measurement made with the mobile device by more than a threshold amount.

The base station location sent to the server may be relative coordinate information that is sent with a reference measurement or other details for the mobile device such that the server may use the supplemental details to determine the absolute position of the base station. Alternatively, the absolute position of the base station may be determined by the phone, and only this absolute position may be communicated to the server for inclusion in the base station almanac of the database.

Thus, in certain embodiments, a computing device such as computing device 805*b* or computing device 805*c* may communicate with a server 860 via network 810 as part of a stopped state determination. For example, server 860*a* may communicate with computing device 805*b* to initiate a plurality of RTT measurements between computing device 805*b* and at least one access point. Any computing device 805 or server 860 on the system may receive the plurality of RTT measurements, analyze the plurality of RTT measurements, and determine that computing device 805*b* is in a stopped state based, at least in part, on the analyzing of the plurality of RTT measurements between computing device 805*b* and the at least one AP. In various alternative embodiments, the determination may be additionally based on other information accessed via network 810, a database 820, or any additional system or measurement for determining position.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application's various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. A method comprising:
    collecting a plurality of round trip time (RTT) measurements between a mobile device and at least one access point (AP);
    analyzing the plurality of RTT measurements; and
    determining that the mobile device is in a stopped state, including:
        analyzing of the plurality of RTT measurements between the mobile device and the at least one AP; and
        determining that a change in measured RTT is below a predetermined threshold for a first period of time.

2. The method of claim 1 wherein the plurality of RTT measurements comprise a first plurality of RTT measurements between the mobile device and a first AP and a second plurality of RTT measurements between the mobile device and a second AP.

3. The method of claim 2 wherein determining that the mobile device is in the stopped state comprises independently analyzing the first plurality of RTT measurements and the second plurality of RTT measurements, and determining that the mobile device is in the stopped state if both the first plurality of RTT measurements and the second plurality of RTT measurements independently identify that the mobile device is in the stopped state.

4. The method of claim 1 further comprising collecting movement data from a plurality of data sources;
    wherein determining that the mobile device is in the stopped state comprises determining that a threshold number of the plurality of data sources and the plurality of RTT measurements identify the mobile device as in the stopped state.

5. The method of claim 1 wherein determining that the mobile device is in the stopped state further comprises filtering the plurality of RTT measurements between the mobile device and the at least one AP.

6. The method of claim 5 wherein the plurality of RTT measurements are filtered using a free particle filter.

7. The method of claim 1 wherein the determining whether the mobile device is in the stopped state is further based at least in part on at least one global navigation satellite service (GNSS) measurement.

8. The method of claim 1 wherein the determining whether the mobile device is in the stopped state is further based at least in part on received signal strength indication (RSSI) measurements between the mobile device and the at least one AP.

9. The method of claim 8 wherein the determining whether the mobile device is in the stopped state is further based on an analysis of a correlation between the RSSI measurements and the plurality of RTT measurements.

10. The method of claim 9 wherein the determining whether the mobile device is in the stopped state is further based at least in part on sensor data from an accelerometer of the mobile device during a first time period.

11. The method of claim 10 wherein the determining whether the mobile device is in the stopped state is further based on an output of a Kalman filter using the sensor data, the RSSI measurements, and the plurality of RTT measurements.

12. The method of claim 1 wherein determining that the mobile device is in the stopped state comprises determining, based at least in part on the plurality of RTT measurements, that a position of the mobile device remains within a threshold area during a first period of time.

13. The method of claim 12 wherein the threshold area is based at least in part on a known noise value associated with RTT measurements involving the at least one AP.

14. The method of claim 12 wherein the threshold area is associated with a predetermined displacement value.

15. The method of claim 14 wherein the predetermined displacement value is 5 cm.

16. The method of claim 14 wherein the predetermined displacement value is received as a user input at the mobile device; and
wherein the predetermined displacement value is 5 m.

17. The method of claim 1 further comprising:
initiating collection of the plurality of RTT measurements in response to a signal from a tracking device that is separate from the mobile device.

18. The method of claim 17 further comprising:
receiving, at the tracking device, a request for the stopped state from a position tracking management entity; and
communicating the signal from the tracking device to the mobile device in response to receiving the request for the stopped state.

19. A mobile device comprising:
means for collecting a plurality of round trip time (RTT) measurements between the mobile device and at least one access point (AP);
means for analyzing the plurality of RTT measurements; and
means for determining that the mobile device is in a stopped state, including:
analyzing the plurality of RTT measurements between the mobile device and the at least one AP; and
determining that a change in measured RTT is below a predetermined threshold for a first period of time.

20. The mobile device of claim 19 further comprising:
means for collecting a plurality of movement measurements in addition to the plurality of RTT measurements; and
means for filtering the plurality of RTT measurements and the plurality of movement measurements.

21. The mobile device of claim 20 further comprising:
means for communicating results of the determining that the mobile device is in the stopped state to a user.

22. A mobile device comprising:
a processor;
a wireless transceiver coupled to the processor; and
a memory coupled to the processor and comprising a round trip time (RTT) positioning module which causes the processor to:
collect a plurality of round trip time (RTT) measurements between the mobile device and at least one access point (AP); and
determine that the mobile device is in a stopped state, including:
analyzing the plurality of RTT measurements between the wireless transceiver and the at least one AP; and
determining that a change in measured RTT is below a predetermined threshold for a first period of time.

23. The mobile device of claim 22 further comprising:
a user input module connected to the processor, wherein the RTT positioning module further causes the processor to:
display a user interface on the mobile device; and
accept a user selected threshold via the user interface.

24. The mobile device of claim 23 wherein the RTT positioning module further causes the processor to:
initiate collection of the plurality of RTT measurements in response to a request from an application module for the stopped state.

25. A non-transitory computer-readable instruction medium comprising instructions that, when executed by a processor coupled to the non-transitory computer-readable instruction medium, cause a mobile device comprising the processor to:
collect a plurality of round trip time (RTT) measurements between the mobile device and at least one access point (AP); and
determine that the mobile device is in a stopped state, including:
analyzing the plurality of RTT measurements between the mobile device and the at least one AP; and
determining that a change in measured RTT is below a predetermined threshold for a first period of time.

26. The non-transitory computer-readable instruction medium of claim 25 wherein the instructions further cause the mobile device comprising the processor to:
identify a plurality of APs; and
select the at least one AP from the plurality of APs.

27. The non-transitory computer-readable instruction medium of claim 26 wherein the at least one AP is selected from the plurality of APs based on a signal quality of the at least one AP.

28. The non-transitory computer-readable instruction medium of claim 26 wherein the at least one AP is selected from the plurality of APs based on a position of the at least one AP.

29. The non-transitory computer-readable instruction medium of claim 25 wherein the plurality of RTT measurements between the mobile device and at least one AP are collected without determining a processing delay associated with the AP.

* * * * *